(12) United States Patent
Biedenstein et al.

(10) Patent No.: US 7,263,520 B2
(45) Date of Patent: Aug. 28, 2007

(54) FAST AGGREGATION OF COMPRESSED DATA USING FULL TABLE SCANS

(75) Inventors: Stefan Biedenstein, Nussloch (DE); Jens-Peter Dittrich, Heidelberg (DE); Erich Marschall, Nussloch (DE); Olaf Meincke, Heidelberg (DE); Klaus Nagel, Heidelberg (DE); Guenter Radestock, Karlsruhe (DE); Andrew Ross, Altrip (DE); Stefan Unnebrink, Heidelberg (DE)

(73) Assignee: SAP AG, Walldorf (DE)

( * ) Notice: Subject to any disclaimer, the term of this patent is extended or adjusted under 35 U.S.C. 154(b) by 410 days.

(21) Appl. No.: 10/789,426

(22) Filed: Feb. 27, 2004

(65) Prior Publication Data

US 2005/0192941 A1 Sep. 1, 2005

(51) Int. Cl.
*G06F 17/30* (2006.01)
*G06F 7/00* (2006.01)

(52) U.S. Cl. .......................................... 707/3; 707/101
(58) Field of Classification Search ................ 707/1–5, 707/101–102
See application file for complete search history.

(56) References Cited

U.S. PATENT DOCUMENTS

| | | | |
|---|---|---|---|
| 5,884,299 A * | 3/1999 | Ramesh et al. ................. 707/2 |
| 6,629,102 B1 * | 9/2003 | Malloy et al. ............... 707/102 |
| 6,775,682 B1 * | 8/2004 | Ballamkonda et al. ...... 707/102 |
| 2002/0077997 A1 * | 6/2002 | Colby et al. ................... 707/1 |
| 2002/0099691 A1 * | 7/2002 | Lore et al. ...................... 707/2 |
| 2002/0152219 A1 * | 10/2002 | Singh .......................... 707/101 |
| 2003/0101194 A1 * | 5/2003 | Rys et al. .................... 707/101 |
| 2004/0199535 A1 * | 10/2004 | Zuk ............................. 707/102 |
| 2006/0010147 A1 * | 1/2006 | Arras et al. ................. 707/101 |

FOREIGN PATENT DOCUMENTS

WO WO 2004/036456 * 4/2004

OTHER PUBLICATIONS

Yang, et al., "A re-examination of text categorization methods", *Proceedings of ACM SIGIR Conference on Research and Development in Information Retrieval*, SIGIR, 1999, pp. 42-49, no months.

(Continued)

*Primary Examiner*—Don Wong
*Assistant Examiner*—Hung Tran Vy
(74) *Attorney, Agent, or Firm*—Mintz, Levin, Cohn, Ferris, Glovsky & Popeo, P.C.

(57) ABSTRACT

Methods and apparatus, including computer systems and program products, relating to an information management system and aggregating data by performing table scans. In general, in one aspect, the technique includes receiving a query for a response to a search on a database, loading data from the database into memory, filtering the data based on the query to generate a list of results, buffering at least one key figure corresponding to a result, buffering at least one dimension value corresponding to each key figure, aggregating the dimension values to generate an aggregate key, aggregating key figures corresponding to the same aggregate key to generate one or more aggregate key figures, and displaying the response to the search on a display device. Loading the data may include compressing the data. Filtering the data may be performed blockwise.

14 Claims, 3 Drawing Sheets

OTHER PUBLICATIONS

Joachims, "Text Categorization with Support Vector Machines: Learning with Many Relevant Features", *Machine Learning: ECML-98, Proceedings of the 10th European Conference on Machine Learning*, Apr. 1998, Chemnitz, Germany, pp. 137-142.

Salton, et al., "A Vector Space Model for Automatic Indexing", *Journal of the American Society for Information Science*, vol. 18, No. 11, Nov. 1975, pp. 613-620.

Witten, et al., *Managing Gigabytes, Compressing and Indexing Documents and Images*, Second Edition, Morgan Kaufmann Publishers, San Francisco, California, USA, 1999, no months.

Joachims, Learning to Classify Text Using Support Vector Machines. Dissertation, Cornell University, Department of Computer Science, Kluwer Academic Publishers, May 2002.

Vivisimo® Clustering Engine, *Content Integrator*, http://www.vivisimo.com, no date & month.

Vivisimo® Clustering Engine, *Clustering Engine*, http://www.vivisimo.com, no date & month.

\* cited by examiner

FAST AGGREGATION OF COMPRESSED DATA USING FULL TABLE SCANS

BACKGROUND

The following description relates to information management systems.

An information management system may include an information retrieval system and/or a database management system. An information management system can include a computer system and one or more databases, each of which is a collection of tables representing classes of physical or conceptual objects. Each object is represented by a record. The information contained in a record may be organized by multiple attributes. For example, if a database were used to keep track of employees in a corporation, each record might represent an employee and each record might include attributes such as a first name, last name, home address, and telephone number.

Relational database management systems are commonly employed to manage relational databases. A relational database is a database that includes one or more tables, where each table is organized by columns and rows. In such a database, each column is an attribute and each row is a record.

There are different ways to view the data in a database. One type of view is known as a multidimensional view. In a multidimensional view, each fact table has several dimensions such that each attribute of a table represents a dimension. Relational databases can be used to generate a multidimensional view of data. One use case for accessing data and performing operations on a database, when using a multidimensional view, is known as online analytical processing (OLAP). In accordance with OLAP, there are many database operations that manipulate data in response to a query, and many of these operations may need to aggregate data in order to generate a result. In relational databases, aggregating data is the process of summarizing a table by selecting columns and representing (e.g. by summing, averaging, or finding the maximum or minimum) the key figures for similar attribute values in each of the selected columns to generate a view with a "coarser granularity." Aggregation may require a table scan. A table scan is the process of reading through a table record by record. Because aggregation may require access to many values in a database, aggregation can be a time and resource consumptive process. Also, because database operations may require a lot of memory, operations tend to have several accesses to a storage device of a computer system while performing the operation, rather than storing a table in a memory of the computer system.

In relational OLAP (ROLAP), the speed of aggregation queries may be increased by having frequently used aggregates precalculated and stored in the database. In multidimensional OLAP (MOLAP), the speed of aggregation queries may be increased by having all the aggregates precalculated and stored in special data structures. Precalculating aggregates tends to reduce response times for any queries that involve the precalculated aggregates; however, the ROLAP solution is advantageous only for those aggregates that are precalculated, and the MOLAP solution is computationally expensive.

SUMMARY

The present disclosure includes systems and techniques relating to an information management system and methods of performing aggregation by table scans. The systems described here, and corresponding techniques for use, may include various combinations of the following features.

In one general aspect, the techniques feature a method of aggregating data in an information management system. The method includes receiving a query for a response to a search on a database, loading data from the database into a memory if the data necessary to generate the response to the query is absent from the memory, filtering the data based on the query to generate a list of results, buffering at least one key figure corresponding to a result in the list of results, buffering at least one dimension value corresponding to each key figure, aggregating the dimension values to generate an aggregate key, aggregating the key figures corresponding to the same aggregate key to generate one or more aggregate key figures, and displaying the response to the search on a display device. In that case, the response to the search includes at least one aggregate key figure.

Implementations may include one or more of the following features. The method may further include generating a hash key based on the aggregate key and storing in a hash table aggregate key figures corresponding to that hash key. Loading data from the database into a memory may include compressing data according to a compression algorithm. In that case, the compression algorithm may be dictionary-based compression. Loading data from the database may include loading data into memory. Loading data from the database into a memory may include organizing the data in the memory as columns of the database. Aggregating the dimension values may include concatenating the dimension values. Filtering the data based on the query may be performed blockwise.

In another aspect, an information management system includes a database and a computer system. In that case the computer system is programmed to load data from the database into a memory, where the data represents a table; filter the data based on a query, which includes generating a list of results, buffer at least one key figure corresponding to a result in the list of results; buffer at least one dimension value corresponding to each key figure; generate an aggregate key based on the dimension values; aggregate key figures with the same aggregate key to generate one or more aggregate key figures; and, display at least one aggregate key figure on a display device.

Implementations may include one or more of the following features. The computer system may be further programmed to generate a hash key based on the aggregate key and store in a hash table aggregate key figures corresponding to the hash key. The operation of loading data from the database into a memory may include compressing data according to a compression algorithm. In that case, the compression algorithm may be dictionary-based compression. The operation of loading data from the database may include loading data into memory. The operation of filtering the data based on the query may be performed blockwise. The operation of loading data from the database into a memory may include organizing the data in the memory as columns of the database. The operation of generating an aggregate key may include concatenating the dimension values.

Implementations of the systems and techniques described here may occur in hardware, firmware, software or a combination of these, and may include instructions for causing a machine to perform the operations described.

The system and method of performing table scans in memory, and related mechanisms and/or techniques described here may provide one or more of the following advantages. Aggregates may be generated each time a query is submitted by performing a table scan. Performing a table scan each time a query is submitted is advantageous because any aggregate can then be generated as required. Performance tends to be increased because data from the database is stored in the memory of at least one computer system when the table scan is performed. The amount of memory required to perform a table scan may be reduced by storing compressed data in the memory.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference numerals and designations in the drawings indicate like elements.

DETAILED DESCRIPTION

The systems and techniques described here relate to an information management system and to a method of performing aggregation by table scans in memory.

Figure 1:
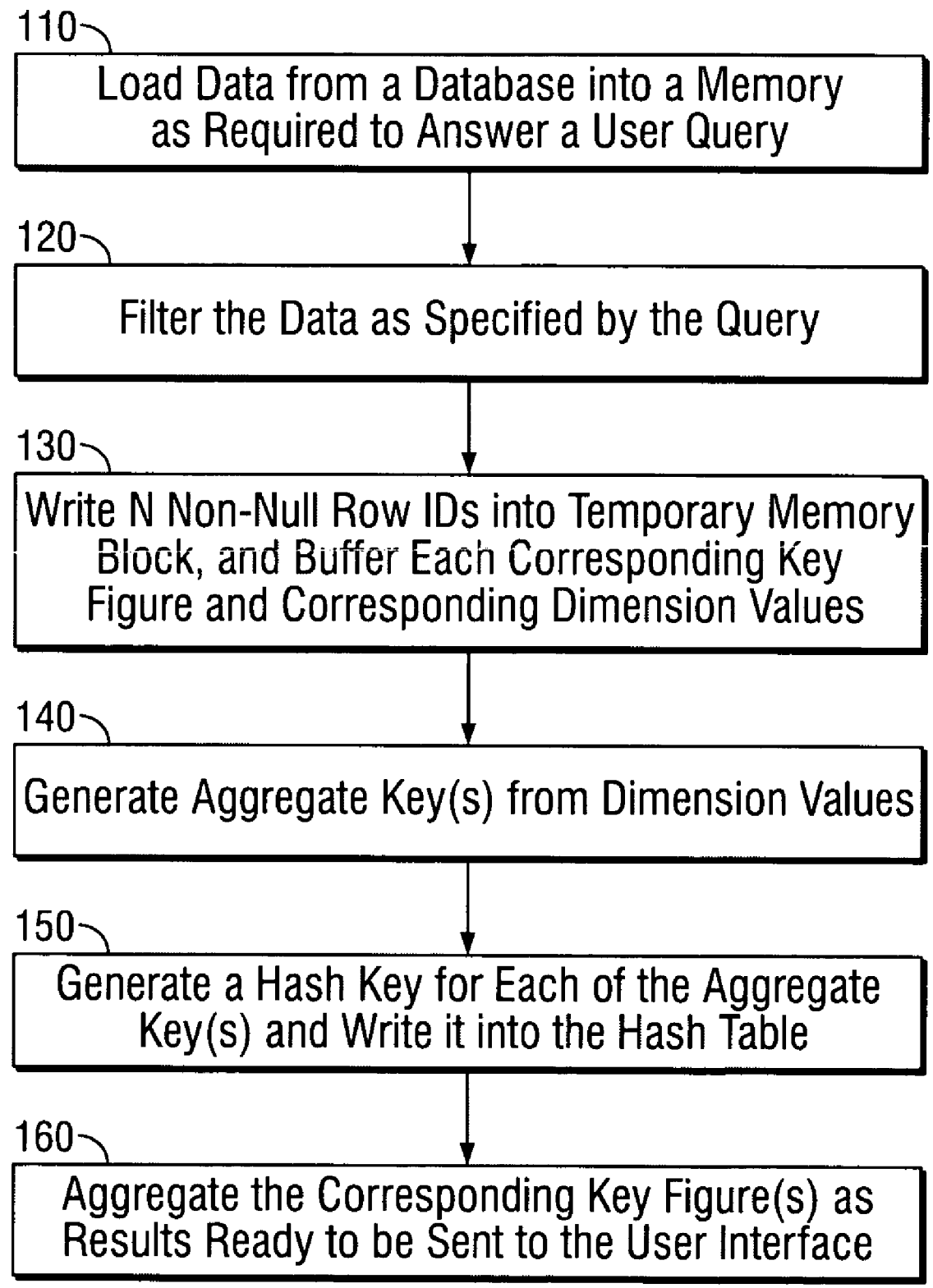
FIG. 1 is a flowchart of a method of aggregating data.

FIG. 1 is a flowchart of a method of aggregating data. At 110, in response to a query, a determination is made of the data required to answer the query. Any data required to answer the query that is not already stored in the memory of the computer system is loaded from a database. If a large volume of data is to be processed, it may be advantageous to distribute the data over multiple computer systems. This tends to speed up the execution of the query and tends to reduce memory consumption in each computer system. Data may need to be loaded into the memories of several computer systems if more data is required to respond to the query than there is memory available on one of the computer systems. The data may be compressed before it is loaded into the memory, which may advantageously reduce the amount of memory necessary to store the data. Any number of compression algorithms may be used. For example, dictionary-based compression may be used. Dictionary-based compression uses a dictionary that maps references to a list of all the values that appear in the database. In any case, the data is logically stored in columns that correspond to the table columns in the database.

At 120, the data in the memory is filtered based on criteria in the query. Filtering uses criteria in the query to generate a list of records that are relevant. For example, a Structured Query Language (SQL).query may include a "where" condition that is used to select the relevant rows from a table, and filtering may be performed based on the "where" condition, such that results are limited to those records that meet the condition. The filtering may be performed blockwise (i.e. in blocks of N rows).

At 130, a block of N row identifiers (IDs) is loaded into a temporary memory location for hashing and aggregation. The value of N may be 1, but depending on the technical specification of the caching mechanism, N may advantageously be set to a value greater than 1, such as 128 or more. If the key figures for a row are still at their initial value (i.e. if they have not been maintained), the row need not be loaded into the cache, since it will have no effect on the aggregate key figures that are to be calculated. For example, a database may exist that organizes customer information by the attributes of customer key or customer identification (ID), time (in months), and the number of products purchased. Some customers in the database might not have purchased any products. In that case, the N block may include a list of row identifiers for records with only those customers who have purchased products. The N block may include row identifiers. Key figures are buffered for each record identified in the N block. The key figure columns contain the data values that are to be aggregated. In the prior example, the key figures may be the number of products purchased. Dimension values may be buffered next to each key figure so that a key figure is identifiable by nearby dimension values. The dimension values are keys for attributes or characteristics that belong together, in a record. For example, if a dimension represents customers, a dimension value may represent a particular customer and the attributes or characteristics that belong together may be customer name and address. In a record, a dimension value appears with one or more key figures. Each row identifier in the N block refers to a dimension value that is buffered. If dictionary-based compression is used, the dimension values that are buffered may be the dictionary references corresponding to the dimension values. All of the buffering should be handled in the memory of a computer system. In alternative implementations the data need not be processed blockwise, i.e. in blocks of N rows.

Aggregate keys are generated at 140. An aggregate key is generated for each combination of dimension values in the buffer. The aggregate keys may be generated by concatenating the dimension values. If dictionary-based compression is used, the aggregate keys may be a concatenation of the dictionary references. For example, if dictionary references 0122 and 06 are used to represent dimension values CompanyA and June, respectively, the aggregate key may be 012206.

At 150, a hash key is generated for each aggregate key and each hash key is written into a hash table. Generating a hash key involves the use of a hash function. In the case that dictionary-based compression is used, the length of the hash key may be set to n bits, where n is greater than or equal to the number of bits needed to represent the product of the cardinalities (i.e. the total number of different values for a dimension value) of the respective dimensions—i.e. $2^n \geq |D1 \times D2 \times \ldots DY|$, where each D is the cardinality of a dimension value. In any case, a suitable procedure must be available for handling hash key collisions.

For each hash key, key figures are aggregated at 160 during a table scan. A table scan is performed over the buffer where the key figures and respective dimension values are stored. The table scan involves the aggregation of the key figures with dimension values that correspond to the same aggregate key. If the table is divided among several computer systems, aggregate key figures may be aggregated locally and a separate server may merge the locally aggregated key figures. The aggregate key figures are entered into a hash table using the respective hash keys generated at 150. The hash table may then be used to generate a suitable display, including the results of the aggregation, at a user interface. The processes of 120-160 of FIG. 1 may be performed in the memory of one or more computer systems, which advantageously tends to increase performance because operations on memory tend to be quicker than operations that involve disk accesses.

Figure 2A:
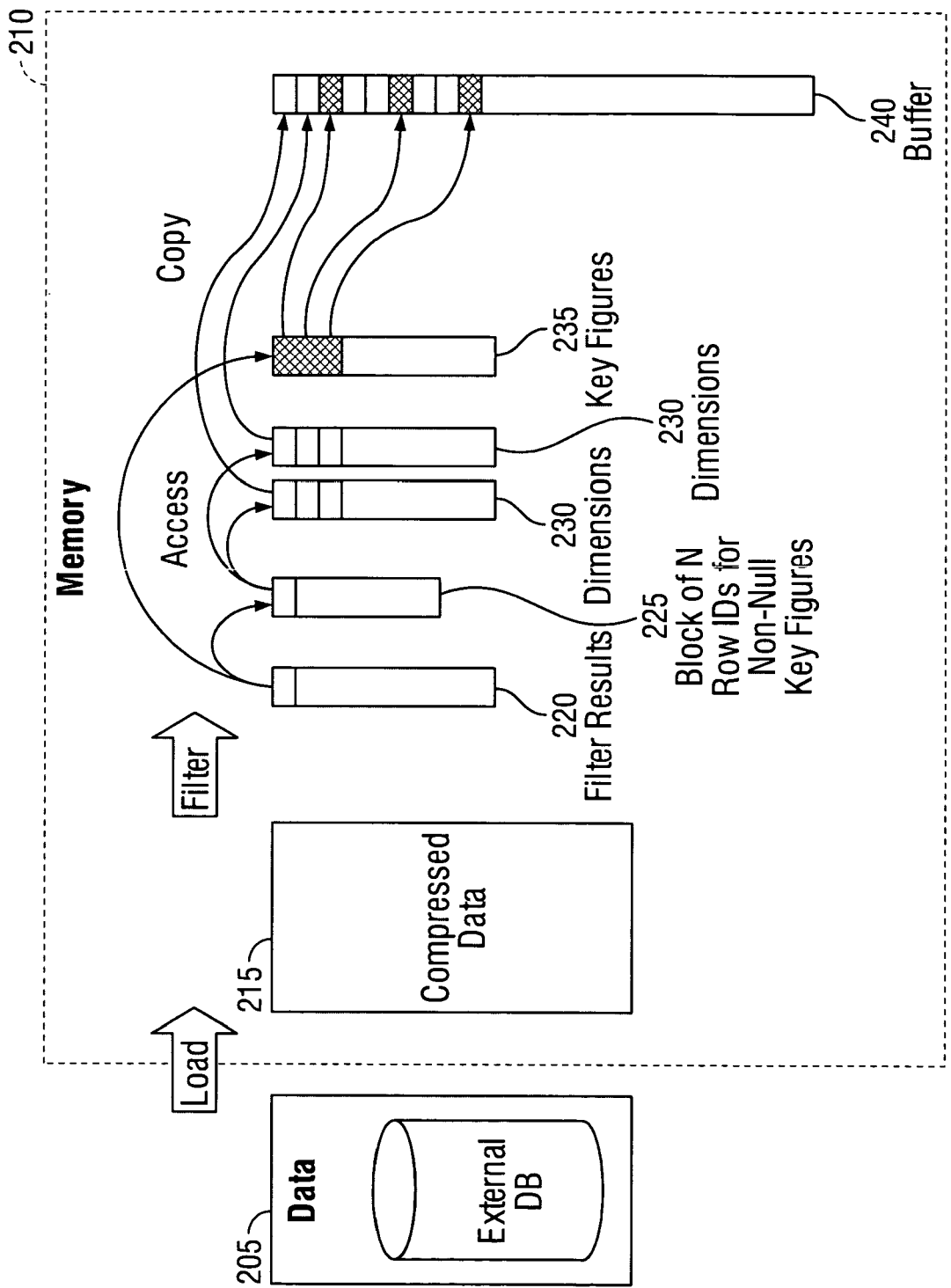
FIGS. 2A, 2B are diagrams of a memory based procedure for extracting aggregate data from an external source.
Figure 2B:
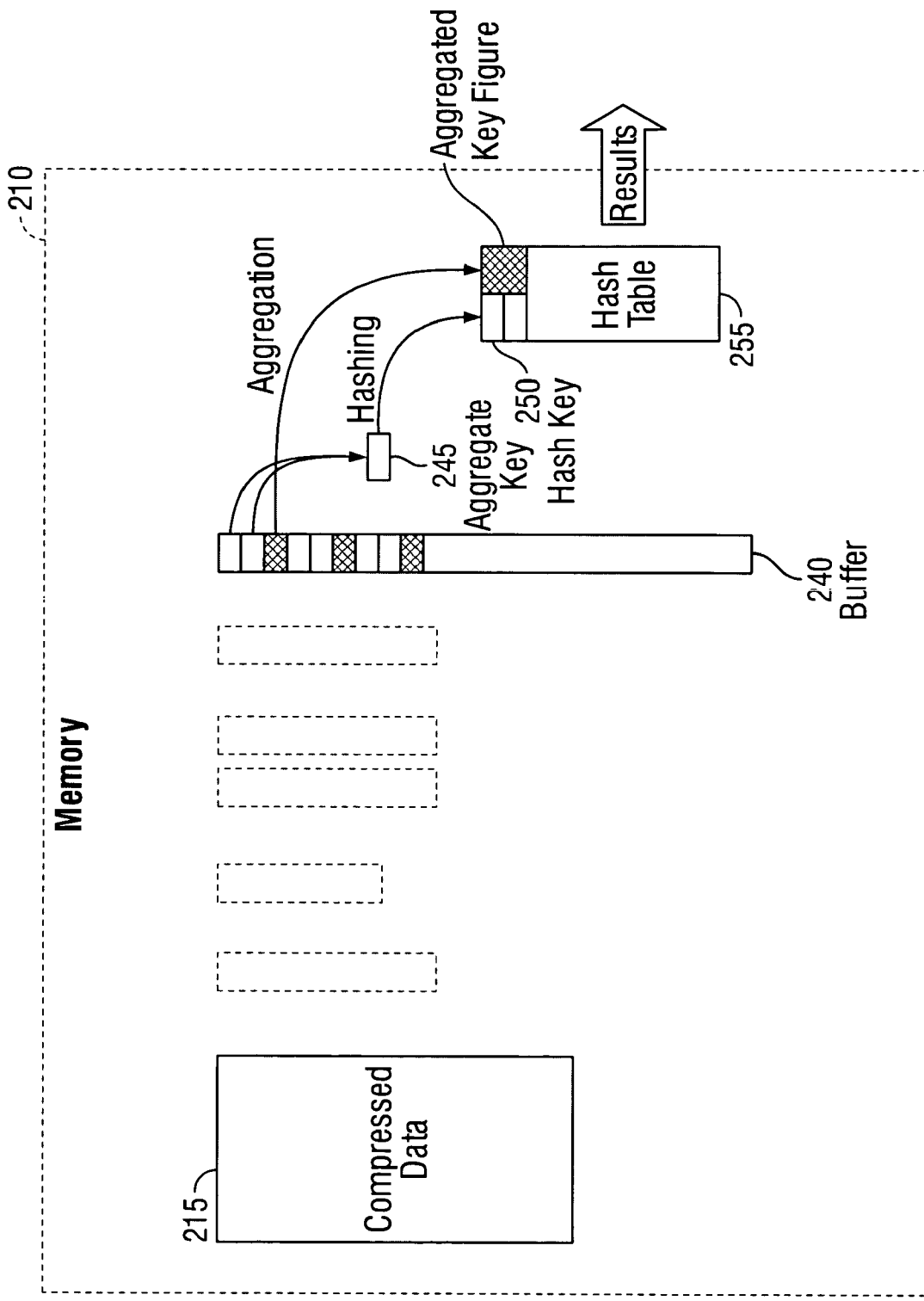

FIGS. 2A, 2B are diagrams of a memory based procedure for extracting aggregate data from an external source, such as a database. FIG. 2A is a procedure for filling a buffer with selected rows of a table that match the criteria in a query. FIG. 2B is a procedure for aggregating key figures corresponding to the selected rows of the table. Database 205 stores one or more tables. The database may exist in one computer system, or may be spread among multiple computer systems. Memory 210 is the memory of a computer system. The memory 210 includes the data 215, the filter results 220, the N block 225, the dimension values 230, the key figures 235, the buffer 240, the aggregate key 245, the hash key 250, and the hash table 255. The memory 210 stores compressed data loaded from the database 205. The data 215 is loaded into the memory 210 in response to a query. If the data necessary to respond to the query already exists in the memory 210, data need not be loaded. Although the data 215 is stored in the memory 210 of one computer system in FIG. 2A, in alternative implementations the data 215 may be loaded and stored in memories of multiple computer systems. The data 215 may be loaded into the memories of multiple computer systems, for example, if there is insufficient memory in one computer system to store the data necessary to respond to a query, or simply to speed up query processing. The data 215 is compressed data and is stored in columns. The data 215 may be compressed based on dictionary-based compression. In accordance with dictionary-based compression, the data 215 may be references that are mapped to a list of possible values. Each column represents a column of the database 205. Although the data 215 in FIG. 2A is compressed data, in alternative implementations the data 215 need not be compressed.

Filtering the data 215 generates the filter results 220. The filter results 220 are a list of row IDs referring to rows that are determined to be relevant based on a query. Filtering may use criteria in the query. For example, "where" conditions of a query may be used such that results are limited to those records which meet the filter condition specified.

The N block 225 is a cached part of the memory that stores row identifiers. The row identifiers correspond to the records in the filter results 220. The N block 225 excludes records that have key figures that are null (i.e. still set at their initial value). Because the N block stores row identifiers that correspond to the filter results 220, the N block is used as a reference when storing the dimension values 230 and the key figures 235 in the buffer 240.

The dimension values 230 and the key figures 235 respectively correspond to row IDs in the N block 225. For each row identifier in the N block, the corresponding key figure and dimension values are stored in the buffer 240. In FIG. 2A, each key figure and its corresponding dimension values are copied from their temporary locations 225 and 230, respectively, to adjacent locations in the buffer 240.

An aggregate key, such as the aggregate key 245, is generated for each combination of dimension values that exists in the buffer 240. Thus, two key figures that have the same dimension values would generate the same aggregate key. The aggregate key 245 may be generated by concatenating the corresponding dimension values. If dictionary-based compression is used, references that represent dimension values may be concatenated.

Each aggregate key is used to generate a hash key, such as the hash key 250. The hash key 250 may be any length and may be generated according to any function for generating hash keys. For example, the hash keys may be at least as long as the aggregate key 245, or the hash key can be shorter than the aggregate key 245. In the case that the hash key 250 is smaller than the aggregate key 245, collisions in the hash table 255 need to be handled. In the case that dictionary-based compression is used, the length of the hash key may be set to n bits, where n is greater than or equal to the number of bits needed to represent the product of the cardinalities (i.e. the total number of different values for a dimension value) of the respective dimensions—i.e. $2^n \geq |D1 \times D2 \times \ldots DY|$, where each D is the cardinality of a dimension value.

The hash table 255 is configured to be indexed by the hash key 250. The hash table 255 stores aggregate key figures. The aggregate key figures are generated by scanning the buffer 240 and aggregating all key figures with the same corresponding aggregate keys. The aggregate key figures are then stored in the hash table 255. From the hash table 255, the aggregate key figures can be accessed so they may be displayed on a display device. In exceptional scenarios where the aggregate keys are short and the result sets are small, a hashing procedure may not be necessary and the results can be aggregated using a simply array. However, in scenarios where the proposed method can scale to nontrivial use cases, hashing is likely to be required.

Although the method of aggregating data is shown in FIG. 1 as being composed of six different processes, additional and/or different processes and subprocesses can be used instead. Similarly, the processes for aggregating data need not be performed in the order depicted. Thus, although a few embodiments have been described in detail above, other modifications are possible. Other embodiments may be within the scope of the following claims.

The invention claimed is:

1. A method of aggregating data in an information management system, the method comprising:

receiving a query for a response to a search on a database;

loading data from the database into a memory if the data necessary to generate the response to the query is absent from the memory, otherwise using the data from memory;

filtering a first block of the data based on the query to generate a list of results for the first block;

buffering at least one key figure corresponding to a result in the list of results of the first block, the buffering of the least one key figure based at least in part on the result being in the list of results;

buffering compressed values representing at least one dimension value corresponding to each key figure being one of the at least one key figures;

aggregating the compressed values representing the dimension values corresponding to the each key figure to generate an aggregate key;

aggregating key figures corresponding to the same aggregate key to generate one or more aggregate key figures;

storing the aggregate key figures and aggregate keys;

performing the filtering, buffering, and aggregating for a second block of the data;

merging aggregate key figures of the first and second blocks of the data; and displaying the response to the search on a display device, wherein the response includes at least one aggregate key figure.

2. A method in accordance with claim 1, wherein the storing comprises generating a hash key based on the aggregate key; and storing in a hash table aggregate key figures corresponding to the hash key.

3. A method in accordance with claim 1, wherein loading data from the database into a memory comprises compressing data according to a compression algorithm.

4. A method in accordance with claim 3, wherein the compression algorithm is dictionary-based compression.

5. A method in accordance with claim 1, wherein loading data from the database comprises loading data into a plurality of memories.

6. A method in accordance with claim 1, wherein loading data from the database into a memory comprises organizing the data in the memory as columns of the database.

7. A method in accordance with claim 1, wherein aggregating the compressed values representing the dimension values comprises concatenating the compressed values representing the dimension values.

8. An information management system, the system comprising:
    a database; and
    a computer system programmed to:
        load data from the database into a memory, wherein the data represents a table;
        filter a first block of the data based on a query, wherein filtering the data comprises generating a list of results for the first block;
        buffer at least one key figure corresponding to a result in the list of results of the first block, the buffering of the at least one key figure based at least in part on the result being in the list of results;
        buffer compressed values representing at least one dimension value corresponding to each key figure being one of the at least one key figures;
        generate an aggregate key based on the compressed values representing the dimension values corresponding to the each key figure;
        aggregate key figures with the same aggregate key to generate one or more aggregate key figures;
        store the aggregate key figures and aggregate keys;
        perform the filtering, buffering, and aggregating for a second block of the data;
        merging aggregate key figures of the first and second blocks of the data; and
        display at least one aggregate key figure on a display device.

9. An information management system in accordance with claim 8, wherein the computer system to store comprises the computer system to:
    generate a hash key based on the aggregate key; and
    store in a hash table aggregate key figures corresponding to the hash key.

10. An information management system in accordance with claim 8, wherein the operation of loading data from the database into a memory comprises compressing data according to a compression algorithm.

11. An information management system in accordance with claim 10, wherein the compression algorithm is dictionary-based compression.

12. An information management system in accordance with claim 8, wherein the operation of loading data from the database comprises loading data into a plurality of memories.

13. An information management system in accordance with claim 8, wherein the operation of loading data from the database into a memory comprises organizing the data in the memory as columns of the database.

14. An information management system in accordance with claim 8, wherein the operation of generating an aggregate key comprises concatenating the compressed values representing the dimension values.

\* \* \* \* \*